Figure 1:
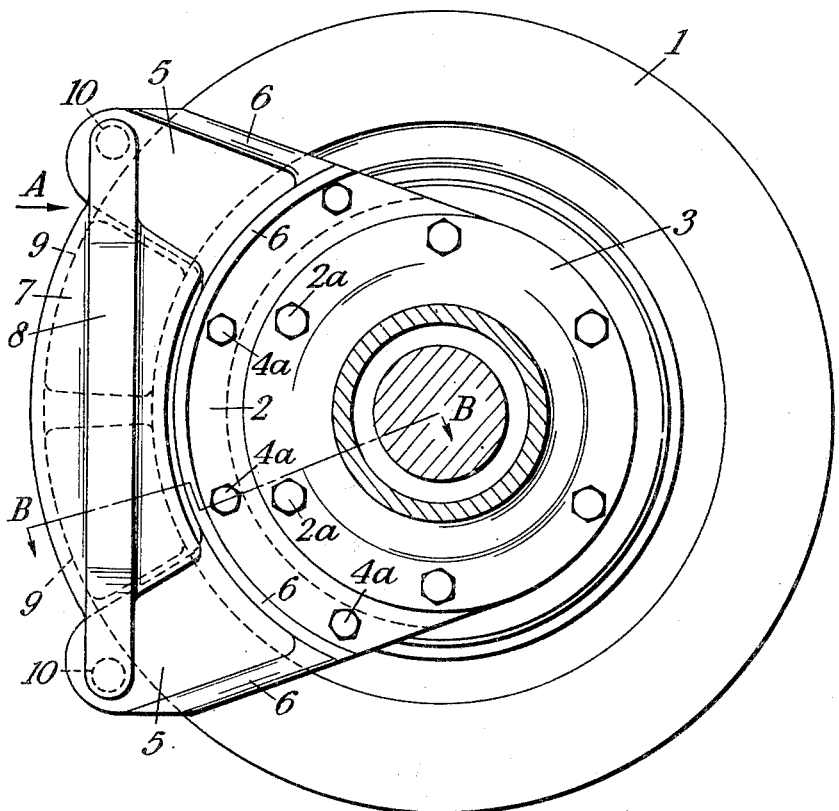

March 12, 1957     H. J. BUTLER     2,784,811
DISC BRAKE FOR VEHICLES

Filed Nov. 12, 1952     4 Sheets-Sheet 1

INVENTOR
Henry James Butler
by Benj. T. Rauber
his attorney

March 12, 1957  H. J. BUTLER  2,784,811
DISC BRAKE FOR VEHICLES

Filed Nov. 12, 1952  4 Sheets-Sheet 2

INVENTOR
Henry James Butler
by Benj. T. Rauber
his attorney

March 12, 1957 H. J. BUTLER 2,784,811
DISC BRAKE FOR VEHICLES
Filed Nov. 12, 1952 4 Sheets-Sheet 3

INVENTOR
Henry James Butler
by Benj. T. Rauba
his attorney

March 12, 1957 — H. J. BUTLER — 2,784,811
DISC BRAKE FOR VEHICLES
Filed Nov. 12, 1952 — 4 Sheets-Sheet 4

INVENTOR
Henry James Butler
by Benj. T. Pauber
his attorney

United States Patent Office 2,784,811
Patented Mar. 12, 1957

2,784,811

DISC BRAKE FOR VEHICLES

Henry James Butler, Sutton Coldfield, England, assignor to Dunlop Rubber Company Limited, London, England, a British company Application November 12, 1952, Serial No. 319,972

7 Claims. (Cl. 188—73)

This invention relates to disc brakes for vehicles and more particularly to disc brakes for motor vehicles and the like.

Disc brakes for vehicles, e. g. aircraft, road vehicles and the like, are known and are generally more efficient than comparable drum brakes. My invention provides and improved type of disc brake for motor vehicles.

According to my invention a disc brake assembly for vehicles comprises a rotatable disc, axially aligned members located on both sides of said disc and occupying a minor portion only of the periphery thereof and connected together by means extending axially adjacent a periphery of said disc, a pad of friction material secured to one of said members to frictionally engage one face of the disc, a fluid pressure operated mechanism associated with the other of said members having a pad of friction material associated therewith to frictionally engage the other face of the disc and means to secure said members to a non-rotatable part of the vehicle to allow said members to move substantially axially relative to the disc.

Preferably a disc brake for vehicles comprises a rotatable disc, a pressure member and a reaction member axially aligned on opposite sides of the disc and occupying a minor portion only of the periphery thereof, said members being connected together by means extending axially adjacent a periphery of said disc, a pad of friction material secured to the pressure member to frictionally engage one face of the disc, means to secure said pressure and reaction members to a non-rotatable part of said vehicle to allow said members to move substantially axially relative to said disc and a fluid-pressure operated mechanism associated with the reaction member and with a pad of friction material thereon facing the face of the disc adjacent to the reaction member to force said pad into frictional engagement with the disc and to move the reaction member and associated pressure member to effect frictional engagement between the other face of the disc and its associated pad.

The two members may be connected together by a portion extending axially adjacent a periphery of the disc, as in a caliper. However to ensure economy of weight and materials and adequate heat dissipation the two members are preferably interconnected at each end only by means extending axially adjacent a periphery of the disc. One or both of said means may be slidable in a torque plate which is secured to a non-rotatable part of the wheel assembly, so that when the fluid-pressure operated mechanism is pressurized both members move axially relative to the torque plate to enable the pads of friction material on both sides of the disc to frictionally engage the disc. The torque plate may comprise an arm extending radially to a location adjacent the periphery of the disc and provided at the end thereof with a squared hole to slidably accommodate one of said axially-extending means, which is of squared section. This prevents angular movement of the members relative to the torque arm. Preferably, however, the torque plate comprises two arms each provided at its end with a round hole and the axially-extending means are cylindrical pins, slidably located in said holes. In an alternative construction the torque plate is dispensed with and one of the members on either side of the disc is connected to a non-rotatable part of the wheel assembly through an articulated linkage which allows the members to move sufficiently for frictional engagement to take place and also allows for vibration and the like of the disc.

The fluid pressure operated mechanism may be a piston and cylinder mechanism, the cylinder thereof being formed integrally with the reaction member or secured thereto and the piston fluid-tightly slidable in the cylinder. The side of the piston remote from the cylinder has associated therewith a pad of friction material adapted to frictionally engage one face of the disc. The pressure member on the other side of the disc, which is connected to the reaction member, is also provided with a friction pad to frictionally engage the other side of the disc. An increase in pressure between the piston and the base of the cylinder forces said piston and base mutually apart. The piston is moved towards the disc, thus forcing the friction pad associated therewith into frictional contact with the disc. The reaction member simultaneously moves away from the disc, thus forcing the pressure member towards the disc and the friction pad associated therewith into frictional contact with the disc. This construction may alternatively comprise two or more piston and cylinder mechanisms.

The fluid pressure operated mtchanism may, instead of a piston and cylinder mechanism, comprise an inflatable sac. In this case means should be provided for preventing over-inflation of the sac as the friction pads wear and means should also preferably be provided for compensating for wear of said pads.

Disc brakes constructed according to the present invention may also be applied mechanically e. g. as by a hand lever and cable.

Figure 3:
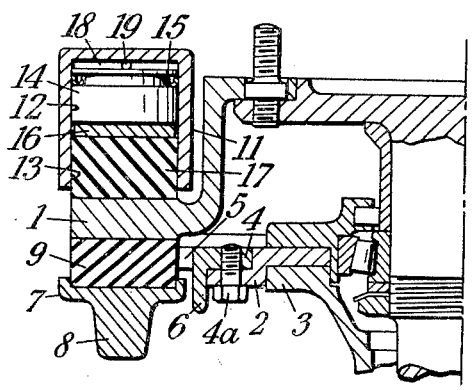
Figure 2:
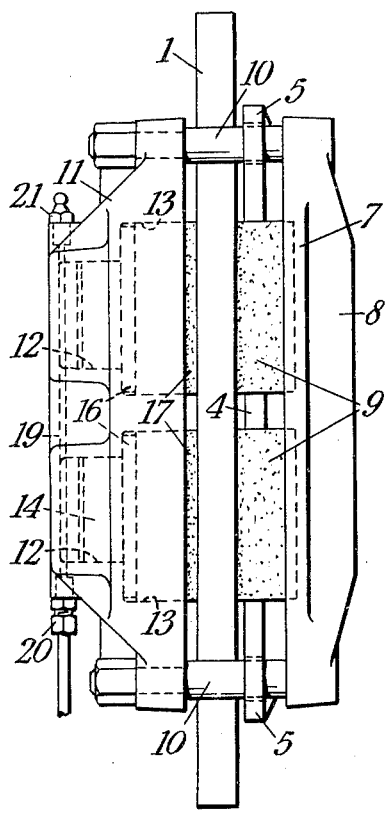
Figure 5:
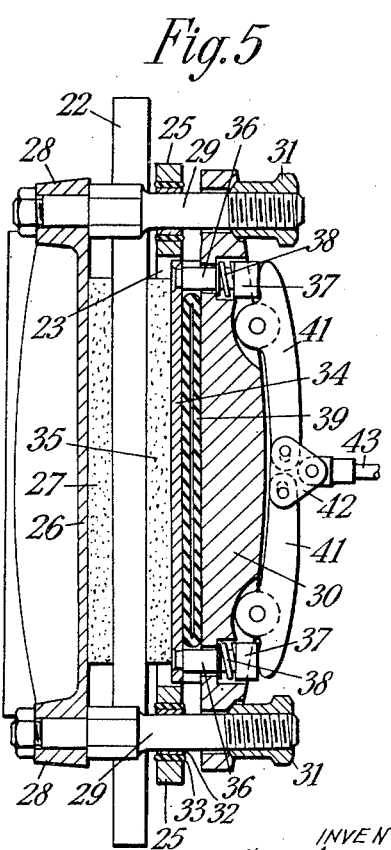
Figure 4:
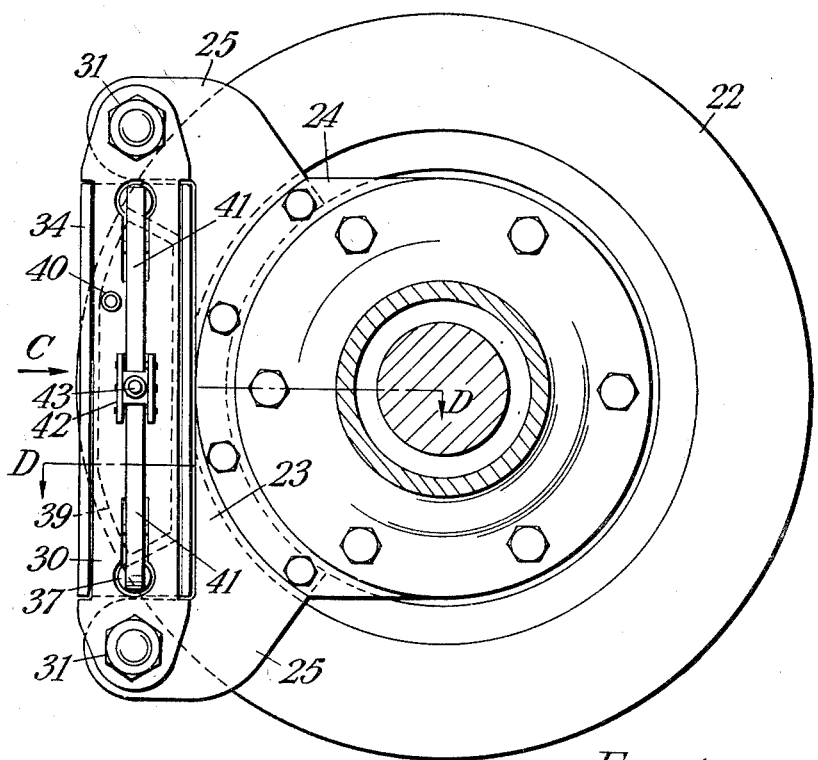
Figure 6:
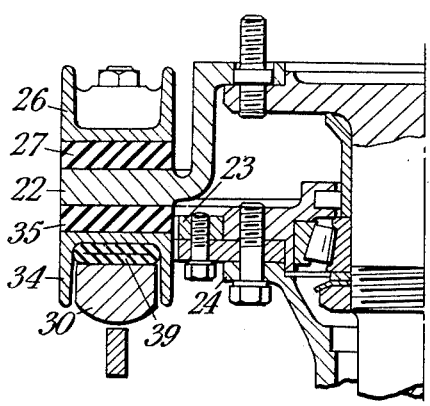
Figure 7:
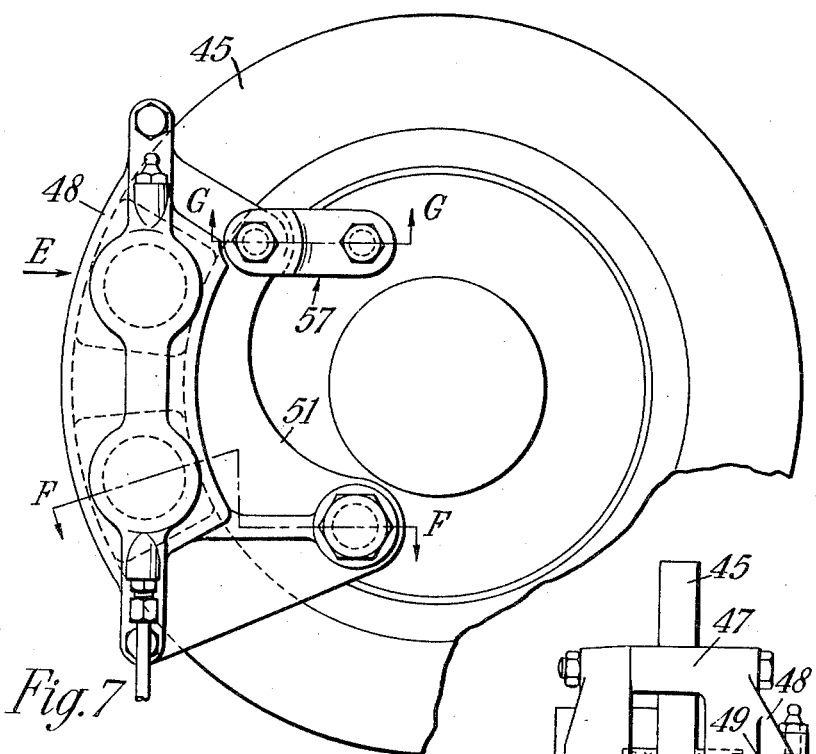
Figure 8:
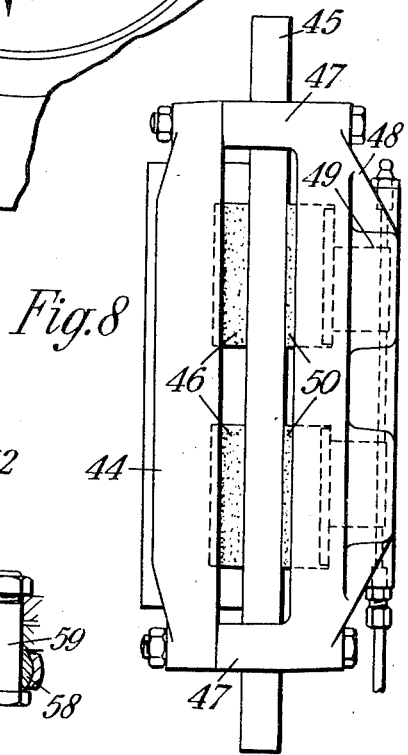
Figure 9:
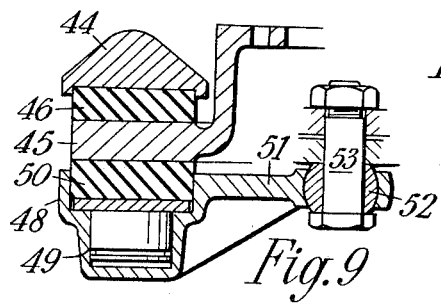
Figure 10:
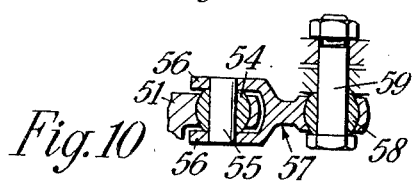

In order that the invention shall be more fully described, reference is made to the accompanying drawings of which:

Fig. 1. is a view of a brake disc and disc brake assembly constructed in accordance with the invention, Fig. 2. is another view of the same assembly taken in the direction of arrow A of Fig. 1, Fig. 3 is a part section of the same assembly taken through the line B—B of Fig. 1 and looking in the direction of the arrows, Fig. 4 is a view of another embodiment of a brake disc and disc brake assembly constructed in accordance with the invention, Fig. 5 is a part-sectional view of the same assembly taken in the direction of arrow C of Fig. 4, Fig. 6 is a part section of the same assembly taken through the line D—D of Fig. 4 and looking in the direction of the arrows, Fig. 7 is a view of yet another embodiment of a brake disc and disc brake assembly constructed in accordance with the invention, Fig. 8 is a view of the same assembly taken in the direction of arrow E of Fig. 7, Fig. 9 is a part section of the same assembly taken through the line F—F of Fig. 7 and looking in the direction of the arrows, and Fig. 10 is a scrap section of the same assembly taken through the line G—G of Fig. 7 and looking in the direction of the arrows.

One embodiment of the present invention, illustrated in Figs. 1-3 of the accompanying drawings, comprises an annular disc 1 secured at its inner periphery to a rotatable part of a vehicle wheel. An annular flange having an extension 2 on one side thereof is secured by bolts 2a to a non-rotatable part 3 of the wheel assembly, and a torque plate 4 is secured by bolts 4a to said extension, the torque plate being provided at each end with an arm 5 extending radially outwards, said arms between them defining a projected angle of the order of 60°. The arms of the torque plate are positioned close to one of the radially-extending sides of the disc and the ends of said arms project beyond the periphery of the disc. The torque plate and arms are provided with stiffening ribs 6.

A pressure member 7 is located adjacent the face of the disc and on the torque plate side of the disc. Said member is integrally provided, on the side remote from the disc with a reinforcing beam 8 extending longitudinally thereof and projecting beyond both ends of said member. The major axis of said beam is normal to a radius of the disc, and said radius bisects said axis. The face of the member adjacent the disc has secured thereto two pads 9 of friction material preferably of the shape shown in Fig. 1, in side-by-side relationship, adapted to frictionally engage the adjacent face of the disc, said pads being positioned between the two arms of the torque plate.

A pin 10 is secured to each of the two projecting ends of said beam 8 and extends axially adjacent the outer periphery of the disc. Said pins are each slidably fitted through a hole in the end of each arm of the torque plate and the ends of said pins remote from the member 7 are rigidly secured to a reaction member 11 on the side of the disc remote from pressure member 7 and axially-aligned with said member. The pins 10 also unite the members 8 and 11 to a unit which is axially movable as a unit relative to the disc 1.

Two axially-aligned cylinders 12 are integrally formed in said reaction member, the open ends thereof being presented towards the disc. The open ends of said cylinders lead into two recesses 13 similar in shape to the pads 9 which are axially-aligned with the friction pads 9 on the other side of the disc. Said cylinders are arranged substantially centrally with respect to the recesses 13. In each cylinder is slidably fitted a piston 14 provided adjacent one end with a seal 15 to prevent the passage of pressure fluid. The other end of each piston abuts a plate 16 which is of the shape of the recess 13 and slidably fitted therein and secured to each of the said plates is a pad of friction material 17 of a shape to fit the recess 13, also slidable in said recess, to frictionally engage the adjacent side of the disc. A space 18 is provided between each piston and the base of the associated cylinder, and said spaces are interconnected through a conduit 19. One of said cylinders is connected, through a fluid connection 20, with a source of fluid pressure, e. g. a master cylinder, and connected to the other cylinder is a bleed-vent 21 for bleeding the system of air bubbles.

The operation of the disc brake and brake disc assembly is as follows. Operation of the master-cylinder or other source of fluid pressure increases the pressure in the space 18 at the base of each cylinder and this in turn forces each piston and base apart. The pistons 14 move inwardly toward the disc, carrying with them the plates 16 and the friction pads 17 abutting said plates, until the said pads are forced in frictional engagement against the adjacent braking face of the disc. Simultaneous with this the cylinders 12 force the reaction member 11 away from the disc and this force, acting through the two pins 10 forces the pressure member 7 on the other side of said disc towards the disc, this in turn forcing the two pads of friction material secured thereto in frictional engagement against the disc. The total braking force is thus distributed evenly on both sides of the disc.

The pressure member 7 and reaction member 11 are rigidly interconnected through the pins 10 which are axially slidable through holes in the non-rotatable torque plate, which thus transmits the torque caused by braking to the non-rotatable parts of the wheel assembly.

In another embodiment of the present invention illustrated in Figs. 4, 5 and 6, an inflatable resilient sac is substituted for the piston and cylinder mechanism. Said embodiment comprises an annular disc 22 secured at its inner periphery to a rotatable part of a vehicle wheel assembly, as in the previous embodiment. A torque plate 23, secured to a flange 24 is bolted to a non-rotatable part of said wheel assembly, and is provided at each end with an arm 25 which extends substantially radially adjacent a braking face of the disc to a location beyond the outer periphery thereof.

A pressure member 26 of channel section is provided having a pad 27 of friction material secured to the base thereof to frictionally engage the face of the disc remote from the torque plate. Secured to a boss 28 at each end of said member is a pin 29 which extends axially adjacent the outer periphery of the disc, through holes provided in the arms 25 of said torque plate and through holes provided in the ends of a reaction member 30 on the side of the disc remote from the pressure plate. The ends of said pins are threaded and a nut 31 is screwed on each of said ends having a portion seating in a recess in the associated end of each hole in member 30. The holes in the arms 25 of the torque plate through which the pins 29 extend each have positioned therein a concentric sleeve 32 secured to the periphery of the hole through the intermediary of a bonded rubber bush 33, the pin being axially slidable in the sleeve. This serves to damp down any vibration or snatch of the brake when idle.

A plate 34 of channel section is positioned over the member 30, the base thereof being located adjacent the disc and slidable between the arms of the torque plate, and the two sides thereof extending axially one on each side of said member. A pad 35 of friction material is secured to said plate to frictionally engage the adjacent face of the disc. Secured centrally to each end of the plate 34 and extending axially therefrom between the two sides thereof is a stud 36 which passes through a hole in said member 30 and is provided at its end with a head 37 positioned within a recess at one end of said hole. The head of the stud is spaced a short distance away from the base of the recess and a helically coiled spring 38 is fitted therebetween. An inflatable resilient sac 39 is fitted between the plate 34 and the adjacent side of the reaction member 30, said sac being provided with conduit means 40 extending through said member 30 and being adapted to be connected to a source of fluid pressure.

The operation of this brake is as follows. On increasing the fluid pressure within the sac it expands, forcing the base of the plate 34 and the reaction member 30 mutually away from each other. The plate 34 moves towards the disc, thus forcing the friction pad 35 secured thereto into braking engagement with the disc while the reaction member is forced in the opposite direction away from the disc. Movement of the reaction member 30 away from the disc, acting through the nuts 31 and pins 29 moves the pressure member 26 towards the disc, thus forcing the friction pads 27 into braking engagement therewith. Means to prevent excessive movement between plate 34 and member 30 and so reduce the possibility of the sac bursting are provided in that the heads of the studs 36 move a predetermined amount only against springs 38 and thus limit the amount of expansion permitted to the sac. The springs 38 serve to collapse the sac after the braking load is removed. Wear of friction pads 27 and 35 may be compensated for by rotating nuts 31 to suitably decrease the distance between pressure member 36 and reaction member 30. Alternatively, automatic compensating means may be provided, of the type described in co-pending application Ser. No. 767,242, filed August 7, 1947, now Patent No. 2,672,223.

The brake may also be provided with means whereby it may be mechanically operated, as in a hand brake, said means being illustrated in Figs. 4, 5 and 6. Two lever members 41 are located adjacent the member 30 and are each pivotally secured thereto adjacent one end. Adjacent ends of said levers are connected to a linkage plate 42 which is in turn connected to a hand-brake cable 43 or the like. Opposite ends of said levers bear against the heads 37 of studs 36. Tension on the cable angularly moves the lever members 41 to pull the member 30 away from the disc and also force the plate 34 towards the disc, thus applying the brake in the manner described.

In yet another embodiment of the present invention illustrated in Figs. 7, 8, 9 and 10 of the accompanying drawings, a construction similar to that described in connection with the first embodiment of the invention is provided. This differs only in that the non-rotatable torque plate is dispensed with and the non-rotatable parts of the brake, instead of being axially slidable relative to said torque arm, are instead secured to a non-rotatable part of the wheel through an articulated connection which not only permits angular tilting of said parts in a plane normal to the plane of the disc to allow the brake to be applied but also permits tilting in a plane parallel to that of the disc to allow said parts to accommodate themselves to lateral distortion and vibration of the disc.

In this embodiment of the invention the brake comprises a pressure member 44 on one side of the disc 45 having pads of friction material 46 secured thereto to frictionally engage one face of the disc. Rigidly secured to said pressure member by members 47 which extend axially adjacent a periphery of said disc is a reaction member 48 located on the other side of said disc and axially-aligned with the member 44. Said reaction member is provided, as in the first embodiment of the invention, with a twin piston and cylinder mechanism 49 and pads of friction material 50 associated with said pistons and adapted to frictionally contact the adjacent face of the disc.

The reaction member 48 is provided, on its inner side, with a ribbed flange 51 extending substantially inwardly towards the hub of the wheel. At one end of this flange is provided a hole having a part-spherical periphery and a bush 52 having a complementary outer periphery fitted in said hole. An axially extending pin 53 is fitted within said bush, being secured at one end to a non-rotatable part of the wheel assembly. The other end of the flange is likewise provided with a hole having a part-spherical sided bush 54 therein, and a pin 55 extending axially within said bush has its two ends each secured to one arm 56 of a bifurcated portion of a link 57. The other end of the link is provided with a hole having a third part-spherical bush 58 fitted therein and through said bush is fitted an axially-extending pin 59 having one end secured to said non-rotatable part of the wheel assembly.

The arrangement is such that as braking pressure is applied the flange 51 tilts about the bushes 52 and 58 to allow sufficient movement of the reaction member and pressure member to enable the friction pads to engage with the disc. Vibration and out of truth of the disc is compensated for by the bush 54 which allows the flange to tilt in the other plane.

Having now described my invention what I claim is:

1. A disc brake assembly for vehicles which comprises a rotatable disc, a pressure member spaced from and extending generally chordwise of one side of said disc with its ends extending beyond the periphery of the disc, a reaction member similarly spaced from the corresponding portion of the opposite side of said disc and having its ends extending beyond the periphery of the disc, a connecting element connecting said projecting ends of said reaction member and pressure member in fixed spacial relation to form a brake unit, a non-rotatable support, a connecting means connected to said support and to said unit to hold said unit from angular movement about the axis of said disc and displaceable in a direction parallel to said axis of said disc to provide for shifting of said unit longitudinally of said axis, friction members one mounted on the pressure member and the other mounted on the reaction member to engage their respective sides of said disc, and a fluid pressure operated mechanism acting between said reaction member and the friction member mounted thereon to force said friction member in one direction into frictional engagement with the adjacent side of said disc and to force said unit in the opposite direction to force the other friction member into frictional engagement with the other side of said disc.

2. A disc brake assembly according to claim 1 wherein said connecting means comprises a torque plate secured to a non-rotatable part of a vehicle wheel assembly having two arms extending substantially radially at an angle to one another and adjacent one face of the disc to a location beyond the outer periphery thereof.

3. The disc brake assembly of claim 1 in which said fluid pressure operated mechanism comprises a cylinder mounted on said reaction member and a piston in said cylinder positioned to force said friction member mounted on said reaction member toward said disc.

4. The disc brake assembly of claim 3 in which said reaction member has a recess in which said friction member is slidable and in which said assembly comprises a plate in said recess between said friction member and said piston.

5. The disc brake assembly of claim 1 in which the fluid pressure operated mechanism comprises an inflatable sac positioned between said reaction member and said friction member.

6. The disc brake assembly of claim 5 having a plate between said friction member and said inflatable sac.

7. A disc brake assembly for vehicles comprising a rotatable disc, a pair of members located one on one side of said disc and the other on the other side and overlying the adjacent face of the disc within a limited sector, said members projecting at their opposite ends beyond the periphery of said disc and being secured together at said projecting ends, a pad of friction material secured to one of said members in position to frictionally engage the face of said disc, a second pad of friction material between the other member and the other face of said disc, a fluid pressure operated mechanism acting between said second pad of friction material and its respective member to move said second pad into frictional engagement with the opposed face of said disc and to move said pair of members axially to bring said first pad into engagement with its respective face of said disc, said members being secured at their projecting ends to a non-rotatable part of said brake assembly and axially slidable relative thereto.

References Cited in the file of this patent

UNITED STATES PATENTS

| | | |
|---|---|---|
| 2,268,329 | Ash | Dec. 30, 1941 |
| 2,351,041 | Hawley | June 13, 1944 |
| 2,419,113 | Bricker | Apr. 15, 1947 |
| 2,612,969 | Hawley | Oct. 7, 1952 |
| 2,663,384 | Chamberlain | Dec. 22, 1953 |